Oct. 13, 1953   H. J. ALMQUIST   2,655,449
BLEACHING PROCESS FOR EGGS
Filed Nov. 5, 1949
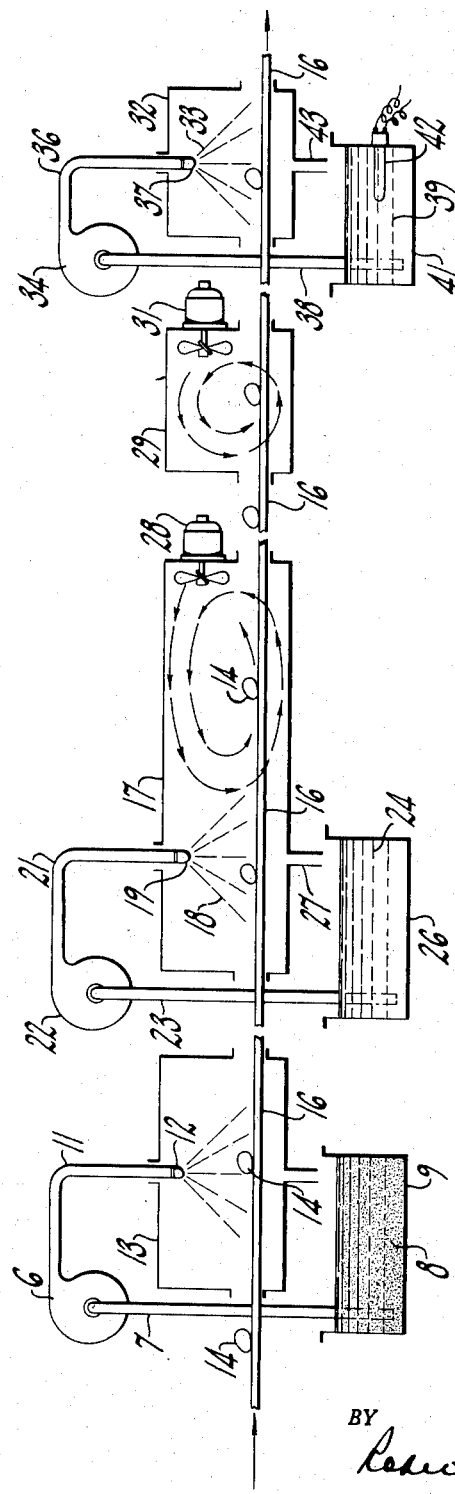
INVENTOR.
Herman J. Almquist
BY
ATTORNEY Patented Oct. 13, 1953

2,655,449

UNITED STATES PATENT OFFICE 2,655,449

BLEACHING PROCESS FOR EGGS

Herman J. Almquist, Modesto, Calif.

Application November 5, 1949, Serial No. 125,767

5 Claims. (Cl. 99—113)

This invention relates to processes for treating eggs to obtain an improved appearance and to impart preservative qualities for marketing.

In the marketing of eggs, premium prices are obtained for uniform packs of eggs having all white or all brown shells, to the considerable price disadvantage of eggs having shells of a creamy or a light tan color.

An object of the present invention is to provide a process for treating eggs having shells of an off-white color wherein the shells of such eggs are bleached to a uniform white color.

Another object of the present invention is to provide a process for sterilizing the shells of eggs and removal therefrom of infectious material.

A further object of the present invention is to provide a process for bleaching the shells of eggs and which does not affect deleteriously the content of the egg within the shell.

The invention possesses other objects and features of advantage, some of which, together with the foregoing, will be set forth in the following description of the preferred form of the invention. It is to be understood, however, that variations in the process as described hereunder may be adopted within the scope of the invention as set forth in the claims.

The drawing illustrates a diagrammatic representation of an apparatus for practicing the process of the present invention.

I have discovered that hydrogen peroxide, $H_2O_2$, can be used to bleach egg shells and that it will not penetrate the shells so as to affect adversely the internal content and quality of the egg. This bleach can be quickly removed from the shell at the end of the treating process, whereby further bleaching action is discontinued and the process thereby rendered easily controllable for obtaining substantial color uniformity of the eggs treated.

Hydrogen peroxide solutions of various strengths may be used to obtain desired bleaching of the color of the egg shells. Strengths ranging from 3 to 90 per cent have been found satisfactory. The usual commercial grade of hydrogen peroxide having a concentration of about 30% can be used to advantage for it is readily available and is easily controlled in use.

Exposure of the egg shells to the hydrogen peroxide may be effected in any desired manner as by dipping the eggs into the bleaching solution, by spraying the solution onto the egg shells, or by merely supporting the eggs in a chamber containing the vapor of such solution while the eggs are wet with water. The process may be carried on at ordinary atmospheric or room temperatures, this not being critical. Satisfactory color bleaching and standardization is effected in from about twelve to forty-eight hours, depending upon the original color of the egg shells and the degree of change desired. The action can be facilitated by irradiation with light rays of a length promoting the action of the hydrogen peroxide on the eggs.

Preferably, the bleaching process is included as a step in an overall cleaning and preservative treatment of the eggs. Apparatus for carrying out such an overall treatment is diagrammatically shown in the drawing. The first step is to effect a sanding of the egg shells so as to remove dirt, stains, and the customary external thin layer of protein and fatty material which normally covers the hard mineral portion of the shell. This coating frequently includes catalase, an enzyme which splits peroxides. Because of this, it is desirable to clean the egg shells and to avoid contact between the shells and the bulk of the peroxide. Either a dry or wet sander may be used. In the present process, the eggs are treated with the hydrogen peroxide immediately on leaving the sander and since the hydrogen peroxide completely sterilizes the egg shells and overcomes all infection on the shell, a wet sander may be used in the present process, and is preferred.

With reference to the drawing, the sanding apparatus is diagrammatically depicted at the left of the figure and includes a blower 6, connected by intake pipe 7 to a source of sanding material 8, here shown in a container 9. The discharge end of the blower is connected by a pipe 11 having a suitable spray head 12 located within a processing chamber 13. Eggs 14 are passed, by means of a conveyor 16, through the chamber 13 and through the sanding spray emanating from the head 12 for cleaning of the eggs.

The eggs are next passed by conveyor 16 directly from the cleaning chamber 13 into a bleaching chamber 17 where the eggs are first contacted by a spray 18 of hydrogen peroxide issuing from a spray head 19 in the chamber. The spray head 19 is connected at the end of a discharge pipe 21 of a pump 22 having a suction pipe connection 23 to a source of hydrogen peroxide 24 within a container 26. The run-off of hydrogen peroxide from the eggs may be gathered in a sump connection 27 for the chamber 17, for delivery back to the container 26, or the run-off may be sent to waste. After leaving the spray 18, the eggs are still retained within the chamber 17 for contact with a circulating atmosphere of the vapor of the hydrogen peroxide solution. Circulation of the hydrogen peroxide atmosphere is effected in the diagrammatic representation by an electric motor fan unit 28. As hereinabove noted, the exposure of the egg shell to the hydrogen peroxide, either in liquid or vaporous form, is carried on over a period of about twelve to forty-eight hours to obtain a desired bleaching and color uniformity of the eggs. Preferably, as here shown and as above discussed, the bleaching action is carried out in a substantially closed chamber under high humidity conditions afforded by liquid and vaporous hydrogen peroxide, so that the liquid content of the egg shells is not subjected to any drying or shrinkage action.

Upon leaving the bleaching chamber 17, the hydrogen peroxide quickly disappears from the shell, and this drying of the shell and dispelling of the last traces of the hydrogen peroxide may be expedited by passing the eggs by conveyor 16 into a drying chamber 29 where an air current is circulated around the egg as by an electric motor fan unit 31.

After drying, it is desirable, to stabilize the quality of the eggs and to prevent shrinkage in subsequent storage, to apply to the egg shell a suitable egg oil in an acceptable manner. As depicted in the drawings, the eggs, on leaving the drying chamber 29, are carried by conveyor 16 into an oiling chamber 32 where the eggs are passed through a spray 33 of oil, preferably a light mineral oil. A pump 34 is here shown with its discharge side connected to a pipe 36 leading to a spray head 37 in the chamber 32 for providing the spray 33, and having its intake side connected by a pipe 38 to a source of oil 39 in a container 41. An electric heating element 42 is here shown for heating the oil where desired for sterilizing. Preferably, the chamber 32 is provided with a sump connection 43 for returning the run-off oil to the container 41. The fact that the eggs are thoroughly cleaned and sterilized in the preceding stages insures the maintenance of the run-back or drained oil in a sanitary condition.

I claim:

1. The process of bleaching shell eggs which consists in applying to said shells a solution of hydrogen peroxide of approximately 30% concentration, and thereafter circulating the vapor of said solution around said shell eggs in contact therewith for a period of about 12 to 48 hours.

2. In the processing of shell eggs, the steps which consist in sanding the shell eggs to remove dirt, stains, protein and fatty materials from the shells, applying a solution of hydrogen peroxide of approximately 30% concentration to the clean shells, and circulating the vapor of said solution around said shells in contact therewith for a period of about twelve to forty-eight hours, and finally drying said shells in an air current.

3. The process of bleaching shell eggs, which consists in applying to said shell eggs a solution of hydrogen peroxide and thereafter circulating the vapor of said solution around said shell eggs in contact therewith for a period of about 12 to 48 hours.

4. The process of bleaching shell eggs which consists of wetting the eggs with water and circulating hydrogen peroxide vapor around said shell eggs for a period of from 12 to 48 hours.

5. In the processing of shell eggs, the steps which consist in sanding the shell eggs to remove dirt, stains, protein and fatty materials from the shells and then applying a solution of hydrogen peroxide of approximately 30% concentration to the sanded shell eggs and thereafter circulating the vapor of said solution around said shell eggs for a period of about 12 to 48 hours.

HERMAN J. ALMQUIST.

References Cited in the file of this patent

UNITED STATES PATENTS

| Number | Name | Date |
|---|---|---|
| 1,412,523 | Hockstadter | Apr. 11, 1922 |
| 1,505,484 | Mulvany et al. | Aug. 19, 1924 |
| 2,184,063 | Meyer et al. | Dec. 19, 1939 |
| 2,221,343 | Mulvany | Nov. 12, 1940 |
| 2,413,631 | Ingle | Dec. 31, 1946 |